United States Patent
Sagesaka et al.

(10) Patent No.: US 11,566,769 B2
(45) Date of Patent: Jan. 31, 2023

(54) VEHICLE LAMP

(71) Applicant: KOITO MANUFACTURING CO., LTD., Tokyo (JP)

(72) Inventors: Yuji Sagesaka, Shizuoka (JP); Masakazu Sato, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/048,313

(22) PCT Filed: Apr. 15, 2019

(86) PCT No.: PCT/JP2019/016158
§ 371 (c)(1),
(2) Date: Oct. 16, 2020

(87) PCT Pub. No.: WO2019/208307
PCT Pub. Date: Oct. 31, 2019

(65) Prior Publication Data
US 2021/0156537 A1    May 27, 2021

(30) Foreign Application Priority Data
Apr. 25, 2018  (JP) .............................. JP2018-083735

(51) Int. Cl.
*F21S 43/27*    (2018.01)
*F21S 43/20*    (2018.01)
(Continued)

(52) U.S. Cl.
CPC .......... *F21S 43/27* (2018.01); *B29C 65/1635* (2013.01); *B29C 66/131* (2013.01);
(Continued)

(58) Field of Classification Search
CPC ............ B29C 65/1435; B29C 65/3604; B29C 66/001; B29C 66/0242; B23K 26/21;
(Continued)

(56) References Cited

U.S. PATENT DOCUMENTS

| | | | |
|---|---|---|---|
| 5,353,154 A * | 10/1994 | Lutz | ........................ F21S 43/33 |
| | | | 359/582 |
| 6,592,239 B1 * | 7/2003 | Akiyama | ............ B29C 65/1638 |
| | | | 362/267 |

(Continued)

FOREIGN PATENT DOCUMENTS

| CN | 106195694 A | 12/2016 |
|---|---|---|
| EP | 2960574 A1 | 12/2015 |

(Continued)

OTHER PUBLICATIONS

International Search Report dated Jun. 25, 2019 for WO 2019/208307 A1 (6 pages).

*Primary Examiner* — Colin J Cattanach
(74) *Attorney, Agent, or Firm* — Venjuris, P.C.

(57) ABSTRACT

A vehicle lamp includes a lamp housing having an inner space and a welding surface, and a cover that covers the inner space and is joined to the lamp housing by laser welding to be disposed adjacent to another vehicle lamp. The cover includes a design surface portion and a welding leg. An end portion of the outer peripheral portion of the design surface portion on another vehicle lamp side is provided as an adjacent side end portion. The welding leg includes a facing surface portion that protrudes from the adjacent side end portion and faces the other vehicle lamp. The facing surface portion is provided at a position extending from an upper end portion to a lower end portion of the adjacent side end portion.

7 Claims, 10 Drawing Sheets

(51) Int. Cl.
  *B60Q 1/24* (2006.01)
  *B29C 65/16* (2006.01)
  *B29C 65/00* (2006.01)
  *F21S 41/29* (2018.01)
(52) U.S. Cl.
  CPC .......... *B29C 66/73365* (2013.01); *B60Q 1/24* (2013.01); *F21S 43/26* (2018.01); *F21S 41/29* (2018.01); *F21S 41/295* (2018.01)
(58) Field of Classification Search
  CPC ........ B23K 26/24; B23K 26/26; B23K 26/28; B23K 26/30; B23K 26/32; B23K 26/18; B60Q 1/0041
  See application file for complete search history.

(56) References Cited

U.S. PATENT DOCUMENTS

| | | | | |
|---|---|---|---|---|
| 10,816,160 | B2* | 10/2020 | Sagesaka | B29C 65/1635 |
| 10,974,461 | B2* | 4/2021 | Sagesaka | B29C 65/1629 |
| 2001/0028567 | A1* | 10/2001 | Akiyama | B29C 66/12469 |
| | | | | 362/520 |
| 2005/0030751 | A1* | 2/2005 | Matsunaga | B29C 65/169 |
| | | | | 362/267 |
| 2016/0061397 | A1* | 3/2016 | Ito | F21S 43/16 |
| | | | | 362/520 |
| 2016/0348866 | A1* | 12/2016 | Ferigo | B29C 66/301 |
| 2017/0268741 | A1* | 9/2017 | Happy | F21S 43/14 |
| 2017/0291353 | A1* | 10/2017 | Sagesaka | B29C 66/3452 |
| 2018/0056855 | A1* | 3/2018 | Happy | B60Q 1/0035 |
| 2020/0263851 | A1* | 8/2020 | Sagesaka | B29C 65/1635 |

FOREIGN PATENT DOCUMENTS

| | | |
|---|---|---|
| JP | S59-069411 U | 5/1984 |
| JP | H10-308104 A | 11/1998 |
| JP | 2003-109412 A | 4/2003 |
| JP | 2006-167946 A | 6/2006 |
| JP | 2016-012460 A | 1/2016 |
| JP | 2017-189887 A | 10/2017 |

* cited by examiner

VEHICLE LAMP

CROSS REFERENCE TO RELATED APPLICATIONS

This application is a national phase of PCT application No. PCT/JP2019/016158, filed on 15 Apr. 2019, which claims priority from Japanese patent application No. 2018-083735, filed on 25 Apr. 2018, all of which are incorporated herein by reference.

TECHNICAL FIELD

The present disclosure relates to a technical field of a vehicle lamp in which a cover is joined to a lamp housing by laser welding.

BACKGROUND

A vehicle lamp such as a tail lamp includes, for example, a so-called seamless type vehicle lamp in which a pair of vehicle lamps is respectively disposed at a non-movable part and a movable part of a vehicle, and the pair of vehicle lamps are integrally recognized as if a single vehicle lamp when positioned adjacent to each other (see, e.g., Patent Document 1). For example, one vehicle lamp is disposed at a body of a vehicle that is a non-movable part, and the other vehicle lamp is disposed at a trunk lid that is a movable part, and the one vehicle lamp and the other vehicle lamp are disposed adjacent to each other when the trunk lid is closed.

In such a seamless type vehicle lamp, in addition to a design surface portion having an outer surface that faces the outside of the vehicle, a facing surface portion (a "leg portion" in Patent Document 1) that is disposed to face with each other in an adjacent state and capable of transmitting light, is provided in each of the pair of vehicle lamps. The facing surface portion is bent with respect to the design surface portion and protrudes from the outer peripheral portion of the design surface portion in a direction substantially perpendicular to the design surface portion.

In the seamless type vehicle lamp, for example, when light is emitted from a light source of the one vehicle lamp, the emitted light is transmitted to the design surface portion of the cover of the one vehicle lamp and irradiated outward, and is transmitted to the two facing surface portions facing each other and incident to the other vehicle lamp. The light is then transmitted to the design surface portion of the cover of the other vehicle lamp, and irradiated outward.

As described above, the facing surface portion has a function of transmitting light and guiding the light to an adjacent vehicle lamp side, and thus, is formed to protrude from the adjacent side end portion of the outer peripheral portion of the design surface portion that is an end portion on the adjacent vehicle lamp side. Since the facing surface portion needs to be present at a position necessary and sufficient for transmitting light toward the adjacent vehicle lamp side, the facing surface portion in the vehicle lamp disclosed in Patent Document 1 protrudes from the portion other than both the upper and lower end portions of the adjacent side end portion.

Meanwhile, in the vehicle lamp, the cover is joined to the lamp housing, but in recent years, the joining operation of the cover with respect to the lamp housing is often performed by laser welding for the purpose of securing an improved joined state or improving productivity.

Therefore, it is required in the seamless type vehicle lamp as well to secure, for example, an improved joined state of the cover with respect to the lamp housing by laser welding.

PRIOR ART DOCUMENT

Patent Document
Patent Document 1: Japanese Laid-Open Patent Publication No. 2017-189887

SUMMARY OF THE INVENTION

Problem to be Solved

As described above, in the seamless type vehicle lamp, the facing surface portion that protrudes from the design surface portion is provided on the cover, and when the facing surface portion is subjected to laser welding to the lamp housing, laser light incident from the design surface portion is incident to the facing surface portion. The laser light transmits inside the facing surface portion in the protruding direction of the facing surface portion from the design surface portion and reaches the welding surface of the lamp housing.

However, in the vehicle lamp in which the cover is joined to the lamp housing by laser welding, when the width of the welding surface is equal to the width of the facing surface portion, a part of the facing surface portion may protrude from the welding surface depending on the positional accuracy of the cover with respect to the lamp housing at the time of joining, and the entire facing surface portion may not be welded to the welding surface, which results in defective joining.

Therefore, in the vehicle lamp in which the cover is joined to the lamp housing by laser welding, in order to ensure that the entire facing surface portion is joined to the welding surface regardless of the positional accuracy of the cover with respect to the lamp housing at the time of joining, the width of the welding surface is larger than the width of the facing surface portion. Therefore, the welding width of the cover with respect to the welding surface is determined in accordance with the width of the facing surface portion.

Meanwhile, in the portion of the cover where the outer peripheral portion of the design surface portion is joined to the welding surface, the welding width of the cover with respect to the welding surface is determined in accordance with the width of the welding surface.

In the joining operation of the cover with respect to the lamp housing by laser welding described above, the laser light irradiated to the adjacent side end portion is scanned from the upper end portion to the lower end portion with the width of the facing surface portion. At this time, in both the upper and lower end portions of the adjacent side end portion where the facing surface portion is not provided, the design surface portion is in contact with the welding surface having a width larger than that of the facing surface portion, and the contact portion is also irradiated with the laser light with the width of the facing surface portion, and thus, an unwelded portion in which the welding is not performed even when the cover is in contact with the welding surface is formed.

However, when the unwelded portion is formed in the portion of the cover in contact with the welding surface, the melted resin in the welded portion adjacent to the unwelded portion may form burrs and be projected to the unwelded portion, or residual foaming marks may be projected to the unwelded portion. Therefore, the burrs or the foaming marks may be noticeable from the outside of the transparent cover, and it may not be possible to secure an improved joined state of the cover with respect to the lamp housing.

Therefore, a vehicle lamp of the present disclosure is to secure an improved joined state of a cover with respect to a lamp housing.

Means to Solve the Problem

First, a vehicle lamp related to the present disclosure includes a lamp housing having an inner space and a welding surface, and a cover configured to cover the inner space and be joined to the lamp housing by laser welding to be disposed adjacent to another vehicle lamp. The cover includes a design surface portion having an outer surface that faces an outside of a vehicle and a portion welded to the welding surface, and a welding leg protruding from a portion of an outer peripheral portion in the design surface portion and welded to the welding surface. An end portion of the outer peripheral portion in the design surface portion on another vehicle lamp side is provided as an adjacent side end portion. The welding leg includes a facing surface portion that protrudes from the adjacent side end portion and faces the other vehicle lamp. The facing surface portion is provided at a position extending from an upper end portion to a lower end portion of the adjacent side end portion.

Therefore, in the end portion of the cover on the other vehicle lamp side, the welding leg provided at the position extending from the upper end portion to the lower end portion is welded to the welding surface, and thus, there is no unwelded portion in the end portion of the cover on the other vehicle lamp side.

Second, in the vehicle lamp related to the present disclosure described above, the welding leg may include an upper side portion that is continuous with the upper end portion of the facing surface portion and is bent with respect to the facing surface portion and a lower side portion that is continuous with the lower end portion of the facing surface portion and is bent with respect to the facing surface portion. The upper side portion and the lower side portion may be positioned along an upper edge and a lower edge of the cover, respectively.

Therefore, the upper end portion and the upper side portion of the facing surface portion are continuously positioned in the upper end portion of the cover on the other vehicle lamp side, and the lower end portion and the lower side portion of the facing surface portion are continuously positioned in the lower end portion of the cover on the other vehicle lamp side.

Third, in the vehicle lamp related to the present disclosure described above, a width of the welding leg may be smaller than a width of a portion of the welding surface to which the welding leg is welded, and a width of a portion of the welding surface to which the design surface portion is welded may be larger than the width of the welding leg.

Therefore, the width of the joined portion of the welding leg that is likely to be sunk during cooling by injection molding becomes small, and the width of the joined portion of the design surface portion that is difficult to be sunk during cooling by injection molding becomes large.

Fourth, another vehicle lamp related to the present disclosure includes a lamp housing having an inner space and a welding surface, and a cover configured to cover the inner space, and joined to the lamp housing by laser welding and adjacent to another vehicle lamp. The cover includes a design surface portion having an outer surface that faces an outside of a vehicle and a portion welded to the welding surface, and a welding leg protruding from a portion of an outer peripheral portion in the design surface portion and welded to the welding surface. An end portion of the outer peripheral portion of the design surface portion on another vehicle lamp side is provided as an adjacent side end portion. The welding leg protrudes from a portion excluding both upper and lower end portions of the adjacent side end portion. Both the upper and lower end portions of the adjacent side end portion is provided as an adjacent side joining portion that is welded to the welding surface, respectively. A portion of the welding surface adjacent to the adjacent side joining portion is provided as a welding end portion. A width of the welding end portion is substantially the same as a width of the welding leg.

Therefore, the end portion of the cover on the other vehicle lamp side is welded to the welding surface in a state where the adjacent side joining portion is in contact with the welding end portion having a width substantially the same as the welding leg, and thus, there is no unwelded portion in the end portion of the cover on the other vehicle lamp side.

Fifth, in the another vehicle lamp related to the present disclosure described above, the lamp housing may include, at both sides of the welding end portion in a width direction, an inclined surface that is away from the cover as being away from the welding end portion in the width direction.

Therefore, the width of the welding end portion is determined in accordance with the formation of the inclined surface on both sides.

As a result, the welding end portions 40*c* and 40*c* may be easily formed, and the improvement in the dimensional accuracy of the width of the welding end portions 40*c* and 40*c* with respect to the width of the welding leg 44 may be promoted.

Sixth, in the another vehicle lamp related to the present disclosure described above, a width of the welding leg may be smaller than a width of a portion of the welding surface to which the welding leg is welded, and a width of a portion of the welding surface to which the design surface portion is welded may be larger than the width of the welding leg.

Therefore, the width of the joined portion of the welding leg that is likely to be sunk during cooling by injection molding becomes small, and the width of the joined portion of the design surface portion that is difficult to be sunk during cooling by injection molding becomes large.

Effect of the Invention

According to the present disclosure, since there is no unwelded portion in the end portion of the cover on the other vehicle lamp side, it is possible to secure an improved joined state of the cover with respect to the lamp housing.

DETAILED DESCRIPTION TO EXECUTE THE INVENTION

Hereinafter, an embodiment for implementing a vehicle lamp of the present disclosure will be described with reference to the accompanying drawings.

In the embodiment described below, a vehicle lamp of the present disclosure is applied to a combination lamp having a tail lamp function. The present disclosure may be widely applied to various vehicle lamps such as a head lamp, a turn signal lamp, a clearance lamp, a stop lamp, a daytime running lamp, a cornering lamp, a hazard lamp, a position lamp, a back lamp, a fog lamp, or a combination lamp which is a combination thereof.

In the descriptions below, the front-rear, up-down, and left-right directions are illustrated with the irradiation direction of light from a light source to the outside as the rear. The front-rear, up-down, and left-right directions illustrated in the following are for convenience of explanation, and the implementation of the present disclosure is not limited to these directions.

(Schematic Configuration of Vehicle)

Figure 1:
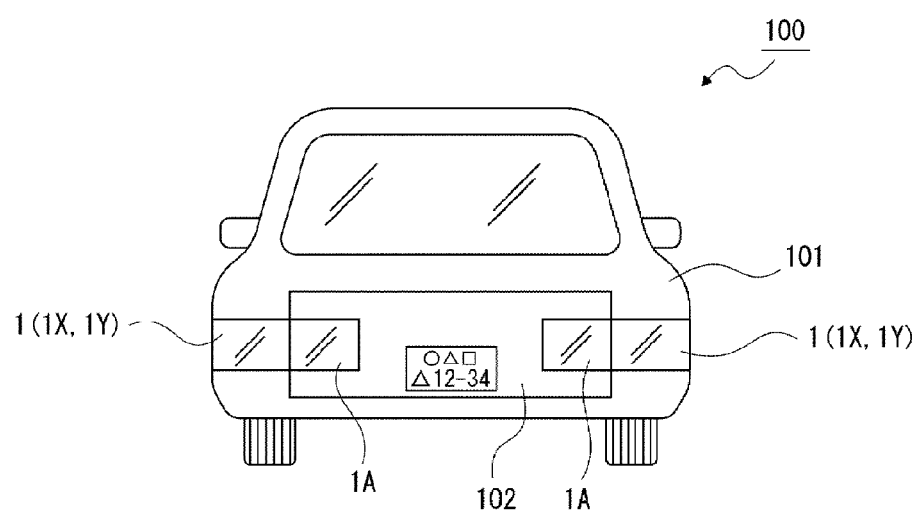
FIG. 1 illustrates an embodiment of a vehicle lamp of the present disclosure together with FIGS. 2 to 13, and is a rear view illustrating a state where the vehicle lamp is disposed at a vehicle.

First, a schematic configuration of a vehicle relating to an arrangement state of a vehicle lamp will be described (see FIG. 1).

Vehicle lamps 1 and 1 are disposed, for example, to be attached to both left and right end portions of a vehicle 100, respectively. A vehicle lamp 1 is disposed at, for example, a non-movable part such as a body 101 of the vehicle 100.

Other vehicle lamps 1A and 1A are disposed at both left and right end portions of a trunk lid 102 that is a movable part, and the vehicle lamps 1A and 1A are positioned adjacent to inner sides of the vehicle lamps 1 and 1, respectively, in a state where the trunk lid 102 is closed.

The vehicle lamp 1 is provided as, for example, a combination lamp having functions of a stop lamp and a turn signal lamp in addition to a function of a tail lamp, and the vehicle lamp 1A is provided as, for example, a combination lamp having a function of a backup lamp in addition to a function of a tail lamp.

In the above, although the example in which the vehicle lamp 1 is disposed at the non-movable part such as the body 101 of the vehicle 100, and the vehicle lamp 1A is disposed at the movable part such as the trunk lid 102 is described, on the contrary, the vehicle lamp 1 may disposed at the movable part such as the trunk lid 102, and the vehicle lamp 1A may be disposed at the non-movable part such as the body 101 of the vehicle 100.

Vehicle Lamp Related to First Embodiment

Next, a vehicle lamp 1X related to a first embodiment will be described (see FIGS. 2 to 8). The vehicle lamp 1X is applied to, for example, the vehicle lamp 1 described above.

Figure 2:
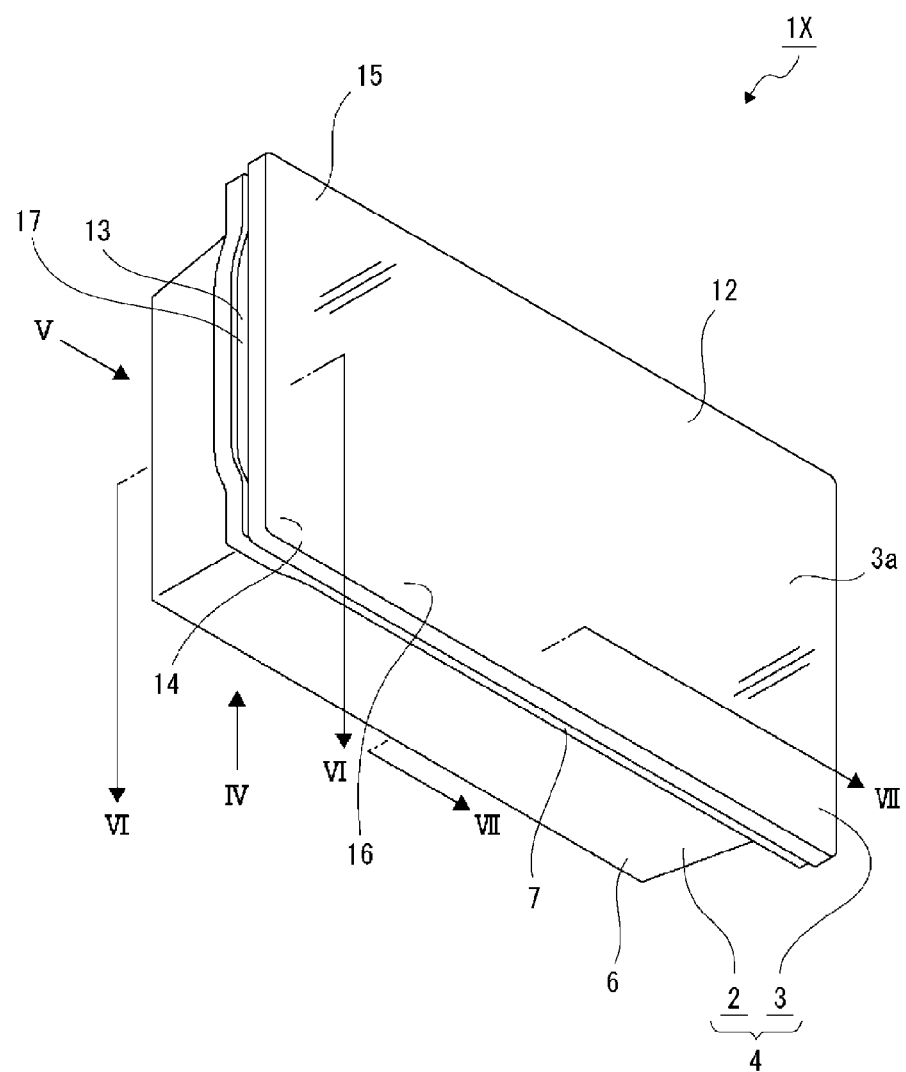
FIG. 2 illustrates a vehicle lamp related to a first embodiment together with FIGS. 3 to 8, and is a perspective view of the vehicle lamp.
Figure 3:
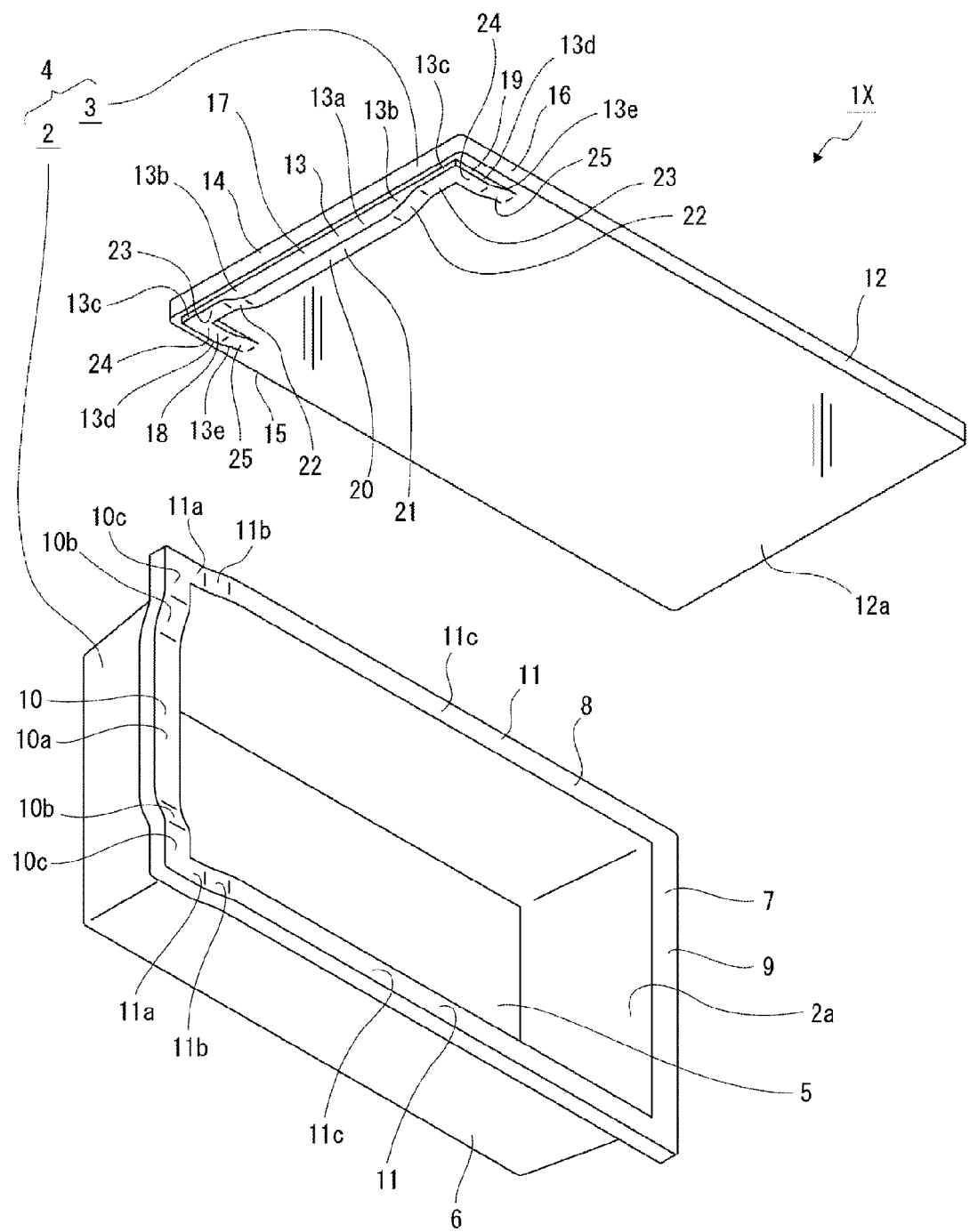
FIG. 3 is a perspective view of the vehicle lamp illustrated in a state where a lamp housing and a cover are separated from each other.

The vehicle lamp 1X includes, for example, a lamp housing 2 that is opened rearward and a cover 3 that closes an inner space 2a of the lamp housing 2 (see FIGS. 2 and 3). A lamp casing 4 is constituted by the lamp housing 2 and the cover 3.

In addition to a light source (not illustrated) that emits light, for example, a light guide (not illustrated) that guides the light emitted from the light source to a predetermined direction is disposed inside the lamp casing 4.

The lamp housing 2 is made of, for example, an opaque resin such as ABS resin (acrylonitrile copolymer resin), and includes, for example, a substantially rectangular base surface portion 5 directed in the substantially front-rear direction, a peripheral surface portion 6 that protrudes substantially rearward from the outer peripheral portion of the base surface portion 5, and a frame-shaped annular portion 7 continuous to the rear end of the peripheral surface portion 6. The outer peripheral side end portion of the annular portion 7 is projected outward from the peripheral surface portion 6 and is formed in a flange shape.

The rear surface of the annular portion 7 is formed as a welding surface 8 (see FIG. 3). The welding surface 8 is formed in, for example, a substantially rectangular shape, and is constituted by a side portion 9, a side adjacent portion 10, and extending portions 11 and 11. The side portion 9 is a portion extending substantially vertically, the side adjacent portion 10 is a portion extending substantially vertically and on the side adjacent to the vehicle lamp 1A, and the extending portions 11 and 11 are portions positioned at the upper side and the lower side and extending substantially in the left-right direction.

An intermediate portion of the side adjacent portion 10 in the vertical direction is formed as a front side portion 10a that is positioned forward from the other portions. Portions of the side adjacent portion 10 respectively continuous to the upper portion and the lower portion of the front side portion 10a are formed as inclined portions 10b and 10b, and the inclined portions 10b and 10b are inclined so as to be displaced rearward as being away from the front side portion 10a, respectively. Both the upper end portion and the lower end portion of the side adjacent portion 10 are formed as rear side portions 10c and 10c that are positioned rearward from the front side portion 10a, and the rear side portions 10c and 10c are continuous to the inclined portions 10b and 10b, respectively.

The end portions of the extending portions 11 and 11 on the side adjacent portion 10 side are formed as front portions 11a and 11a that are positioned forward from the other portions, respectively. Portions of the extending portions 11 and 11 respectively continuous to the front portions 11a and 11a are formed as inclined portions 11b and 11b, and the inclined portions 11b and 11b are inclined so as to be displaced rearward as being away from the front portions 11a and 11a, respectively. The portions of the extending portions 11 and 11 opposite to the front portions 11a and 11a across the inclined portions 11b and 11b are formed as rear portions 11c and 11c that are positioned rearward from the front portions 11a and 11a, respectively. The front portions 11a and 11a are positioned on the same plane as the rear side portions 10c and 10c in the front-rear direction, respectively.

In the welding surface 8, the width of the side portion 9 and the extending portions 11 and 11 is equal, and the width of the side adjacent portion 10 is larger than the width of the side portion 9 and the extending portions 11 and 11.

The cover 3 is made of, for example, a transparent material such as acrylic, and a design surface portion 12 that has an outer surface 3a facing the outside of the vehicle 100 and a welding leg 13 that protrudes forward from a part of an inner surface 12a of the design surface portion 12 are integrally formed.

The design surface portion 12 is formed in, for example, a substantially rectangular plate shape, and the end portion on the side adjacent to the vehicle lamp 1A is formed as an adjacent side end portion 14. The size of the outer shape of the design surface portion 12 is slightly larger than the outer shape of the annular portion 7 of the lamp housing 2 except for the adjacent side end portion 14.

Figure 4:
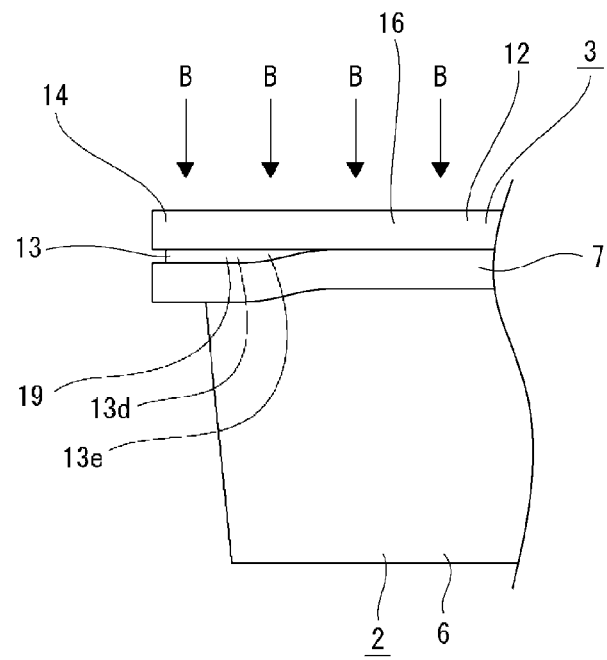
FIG. 4 is a view from a direction of IV in FIG. 2.
Figure 5:
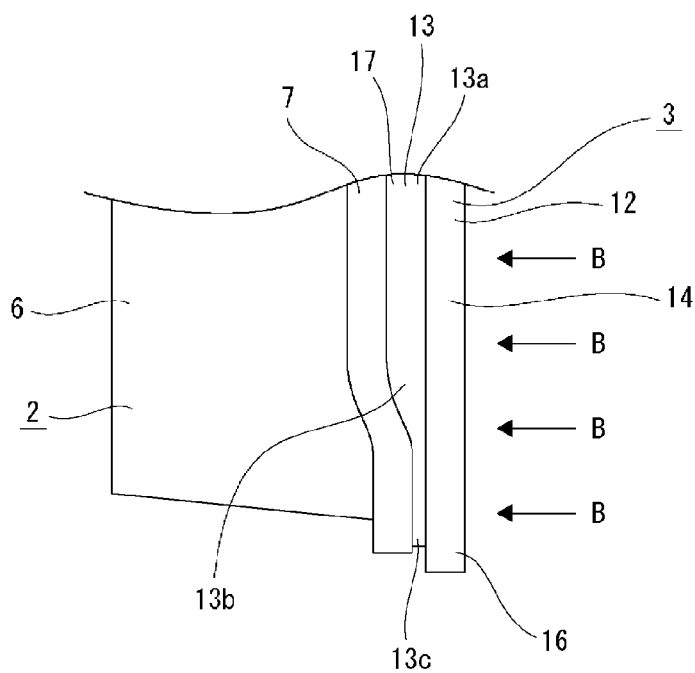
FIG. 5 is a view from a direction of V in FIG. 2.

The welding leg 13 protrudes from a position extending from the adjacent side end portion 14, a part of an upper end portion 15, and a part of a lower end portion 16 of the design surface portion 12 (see FIGS. 3 to 5). The width of the welding leg 13 is smaller than the width of the welding surface 8 of the lamp housing 2. The welding leg 13 is constituted by a facing surface portion 17 that protrudes from the adjacent side end portion 14, an upper side portion 18 that protrudes from an end portion of the upper end portion 15 on the adjacent side end portion 14 side, and a lower side portion 19 that protrudes from an end portion of the lower end portion 16 on the adjacent side end portion 14 side.

The facing surface portion 17 is formed in a shape extending vertically, and is formed at a position extending from the upper end portion and the lower end portion of the adjacent side end portion 14. The upper side portion 18 and the lower side portion 19 are formed in a shape extending in the left-right direction, and are bent in a direction substantially perpendicular with respect to the facing surface portion 17.

A tip surface of the welding leg 13 is formed as a joining surface 20 that is joined to the welding surface 8 by laser welding. The joining surface 20 is formed to have a constant width that is smaller than the width of the welding surface 8.

In the joining surface 20 of the facing surface portion 17, an intermediate portion in the vertical direction is formed as a first joining portion 21 positioned forward from the other portions. In the joining surface 20 of the facing surface portion 17, portions respectively continuous to the upper portion and the lower portion of the first joining portion 21 are formed as second joining portions 22 and 22, and the second joining portions 22 and 22 are inclined so as to be displaced rearward as being away from the first joining portion 21, respectively. In the joining surface 20 of the facing surface portion 17, both upper and lower end portions are formed as third joining portions 23 and 23 positioned rearward from the first joining portion 21 and 21, respectively.

In the joining surface 20 of the upper side portion 18 and the lower side portion 19, the end portions of the facing surface portion 17 side are formed as fourth joining portions 24 and 24 positioned forward from the other portions, respectively. In the joining surface 20 of the upper side portion 18 and the lower side portion 19, portions continuous to the fourth joining portions 24 and 24 are formed as fifth joining portions 25 and 25, and the fifth joining portions 25 and 25 are inclined so as to be displaced rearward as being away from the fourth joining portions 24 and 24, respectively. The fourth joining portions 24 and 24 are positioned on the same plane with the third joining portions 23 and 23 in the front-rear direction, respectively.

Therefore, the welding leg 13 is constituted by a first portion 13a, second portions 13b and 13b, and third portions 13c and 13c formed as each part of the facing surface portion 17, and fourth portions 13d and 13d and fifth portions 13e and 13e formed as each part of the upper side portion 18 or the lower side portion 19.

The first portion 13a has the first joining portion 21 and the protrusion amount from the design surface portion 12 is maximized. The second portions 13b and 13b have the second joining portions 22 and 22, respectively, and are continuous to the upper portion and the lower portion of the first portion 13a, respectively, and the protrusion amount from the design surface portion 12 in the vertical direction is changed. The third portions 13c and 13c have the first joining portions 23 and 23, respectively, and the protrusion amount from the design surface portion 12 is smaller than the protrusion amount of the first portion 13a. The fourth portions 13d and 13d have the fourth joining portions 24 and 24, respectively, and the protrusion amount from the design surface portion 12 is equal to that of the third portions 13c and 13c. The fifth portions 13e and 13e have the fifth joining portions 25 and 25, respectively, and are continuous to the fourth portions 13d and 13d, respectively, and the protrusion amount from the design surface portion 12 in the left-right direction is changed.

In the vehicle lamp 1X configured as described above, the cover 3 is joined to the lamp housing 2 by laser welding. The joining of the cover 3 to the lamp housing 2 by laser welding is performed by irradiating laser light B from the outer surface side of the design surface portion 12 (see FIGS. 4 to 7).

The laser light B transmits the design surface portion 12 or the design surface portion 12 and the welding leg 13, and reaches the welding surface 8 of the lamp housing 2. When the laser light B reaches the welding surface 8, the joining surface 20 or the inner surface of the design surface portion 12 and the welding surface 8 are melted, and the cover 3 is joined to the lamp housing 2.

At this time, as illustrated in FIGS. 4 and 5, in the facing surface portion 17, the first joining portion 21 is welded to the front side portion 10a of the side adjacent portion 10, the second joining portions 22 and 22 are welded to the inclined portions 10b and 10b of the side adjacent portion 10, respectively, and the third joining portions 23 and 23 are welded to the rear side portions 10c and 10c of the side adjacent portion 10, respectively. Further, the fourth joining portions 24 and 24 of the upper side portion 18 and the lower side portion 19 are welded to the front portions 11a and 11a of the extending portions 11 and 11, respectively, the fifth joining portions 25 and 25 of the upper side portion 18 and the lower side portion 19 are welded to the inclined portions 1lb and 1lb of the extending portions 11 and 11, respectively, and the upper end portion and the lower end portion of the inner surface 12a except for the upper side portion 18 and the lower side portion 19 are welded to the rear portions 11c and 11c of the extending portions 11 and 11, respectively. The inner surface of the end portion of the design surface portion 12 on the side opposite to the adjacent side end portion 14 in the left-right direction is welded to the side portion 9.

As a welding method of the cover 3 with respect to the lamp housing 2, a scan method in which an irradiation head is moved along the outer peripheral portion of the design surface portion 12 to perform the irradiation of laser light, or a galvano method in which an irradiation head is fixed and a galvano mirror is operated inside the irradiation head to perform the irradiation of laser light is used. The welding of the cover 3 with respect to the lamp housing 2 may be performed by the scan method, for example, for a portion where the welding leg 13 is joined to the welding surface 8 since it is necessary to secure a good transmission state of the laser light B with respect to the welding leg 13 by irradiating the welding surface 8 with the laser light B perpendicularly, and may be performed by the galvano method capable of irradiating the laser light B in a wide range substantially at the same time for a portion where the design surface portion 12 is joined to the welding surface 8. The scan method may be used in the irradiation of the laser light to the adjacent end portion 14, and the galvano method may be used in the irradiation of the laser light to the other portions.

In the state where the cover 3 is joined to the lamp housing 3, the outer peripheral surface of the design surface portion 12 is positioned outside the outer peripheral surface of the annular portion 7 except for the adjacent side end portion 14, and the position of the side surface of the adjacent side end portion 14 in the left-right direction is substantially aligned with the position of the side edge of the side adjacent portion 10 outer side.

Figure 6:
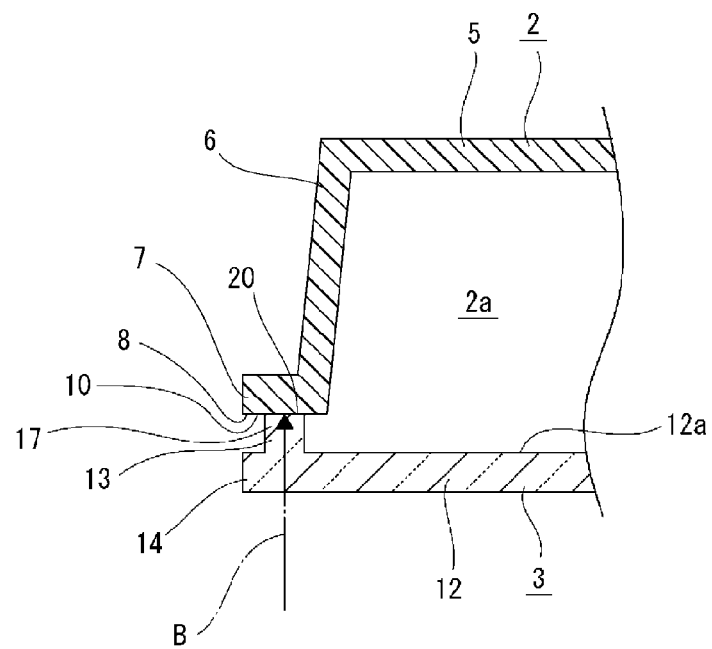
FIG. 6 is a cross-sectional view taken along the line VI-VI in FIG. 2.
Figure 7:
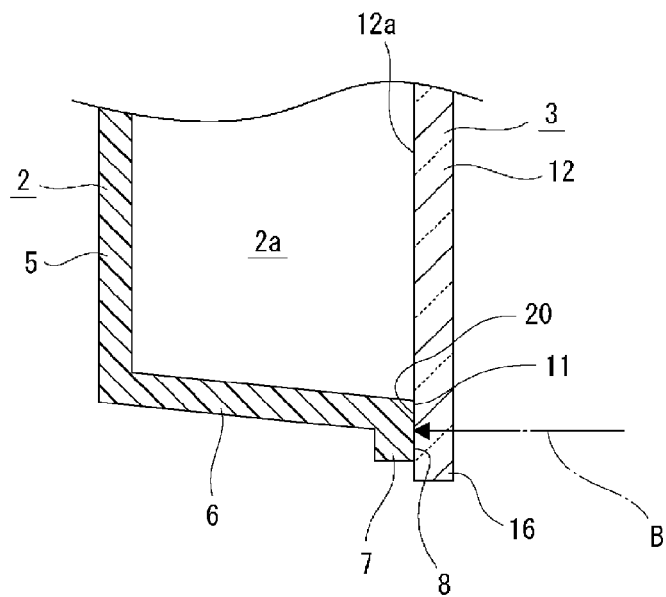
FIG. 7 is a cross-sectional view taken along the line VII-VII in FIG. 2.
Figure 8:
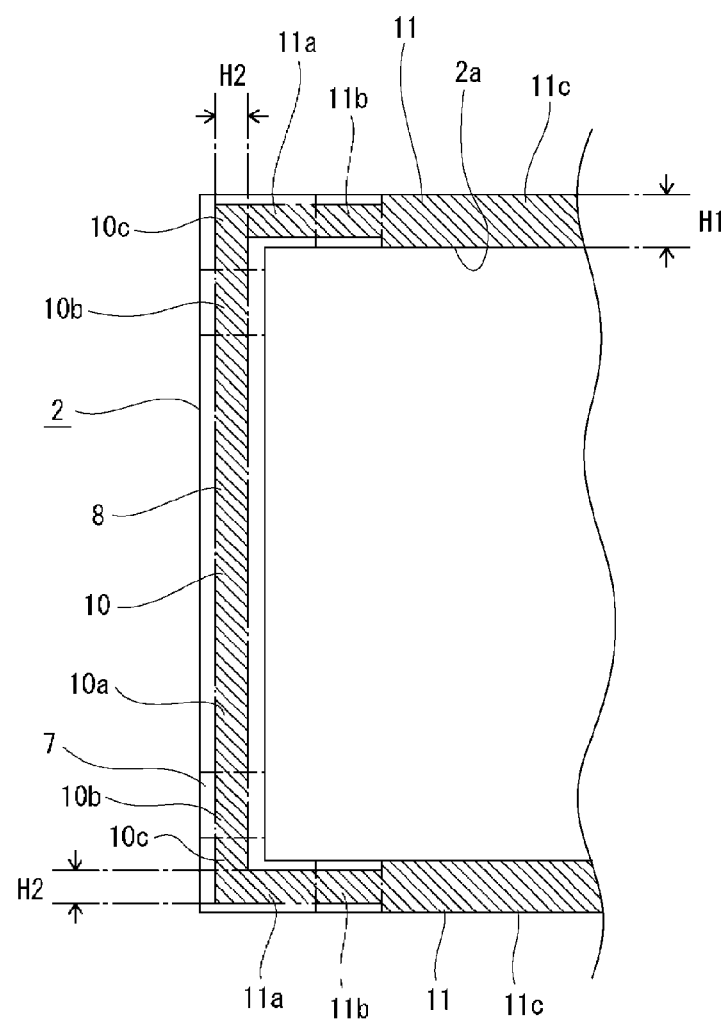
FIG. 8 is a rear view illustrating a welding portion in a lamp housing.

Further, as described above, since the joining surface 20 is formed to have a constant width that is smaller than the width of the welding surface 8, the joining surface 20 is welded, for example, to the central portion of the welding surface 8 in the width direction (see FIG. 6).

As described above, since the joining surface 20 is smaller than the width of the welding surface 8, regardless of the positional accuracy of the cover 3 with respect to the lamp housing 2, the entire joining surface 20 is welded and joined to the welding surface 8, and thus, it is possible to secure an improved joined state of the cover 3 with respect to the lamp housing 2. Further, by making the joining surface 20 smaller than the width of the welding surface 8 to reduce the width of the welding leg 13, it is possible to suppress the sink of the welding leg 13 during cooling of the cover 3 by injection molding, and high processing accuracy of the cover 3 may be secured.

Further, in a portion where the welding leg 13 is not provided, the design surface portion 12 of the cover 3 is welded and joined to the welding surface 8. However, as described above, since the outer peripheral surface of the design surface portion 12 is positioned outside the outer peripheral surface of the annular portion 7 except for the adjacent side end portion 14, a portion of the design surface portion 12 slightly inside from the outer periphery is welded and joined to the welding surface 8 (see FIG. 7).

As described above, the outer shape of the design surface portion 12 is larger than the outer shape of the annular portion 7, so that the outer peripheral surface of the design surface portion 12 except for the adjacent side end portion 14 is positioned outside the outer peripheral surface of the annular portion 7. Therefore, regardless of the positional accuracy of the cover 3 with respect to the lamp housing 2, the design surface portion 12 is welded and joined to the entire welding surface 8, and thus, it is possible to secure an improved joined state of the cover 3 with respect to the lamp housing 2.

In order to secure high joinability of the cover 3 with respect to the lamp housing 2, the welding area of the cover 3 with respect to the lamp housing 2 may be wide. In the vehicle lamp 1X, a width H1 of a portion to which the design surface portion 12 is joined is larger than a width H2 of a portion to which the welding leg 13 is joined (the welding portion is illustrated by hatching in FIG. 8).

As described above, by making the width H1 of the portion to which the design surface portion 12 where the sink is unlikely caused during cooling by injection molding is joined large, and by making the width H2 of the portion to which the welding leg 13 where the sink is likely caused during cooling by injection molding is joined small, high joinability of the cover 3 with respect to the lamp housing 2 is promoted by securing a sufficient welding area, and then high forming accuracy of the cover 3 may be secured.

As disclosed above, in the vehicle lamp 1X, the welding leg 13 includes the facing surface portion 17 that protrudes from the adjacent side end portion 14 and faces other vehicle lamp 1A, and the facing surface portion 17 is provided at the position extending from the upper end portion and the lower end portion of the adjacent side end portion 14.

Therefore, in the end portion of the cover 3 on the vehicle lamp 1A side, the welding leg 13 provided at the position extending from the upper end portion to the lower end portion is welded to the welding surface 8, and there is no unwelded portion in the end portion of the cover 3 on the vehicle lamp 1A side, and thus, problems such as burrs or foaming marks are projected to the unwelded portion do not occur, and an improved joined state of the cover 3 with respect to the lamp housing 2 may be secured.

Further, the welding leg 13 is provided with the upper side portion 18 continuous to the upper end portion of the facing surface portion 17 and bent with respect to the facing surface portion 17 and the lower side portion 19 continuous to the lower end portion of the facing surface portion 17 and bent with respect to the facing surface portion 17, and the upper side portion 18 and the lower side portion 19 are positioned along the upper edge and the lower edge of the cover 3, respectively.

Therefore, since the upper end portion of the facing surface portion 17 and the upper side portion 18 are continuously positioned on the upper end portion of the cover 3 on the vehicle lamp 1A side, and the lower end portion of the facing surface portion 17 and the lower side portion 19 are continuously positioned on the lower end portion of the cover 3 on the vehicle lamp 1A side, the thickness of the portion of the cover 3 on the vehicle lamp 1A side becomes thick, and the rigidity of the cover 3 may be increased.

Vehicle Lamp Related to Second Embodiment

Next, a vehicle lamp 1Y related to a second embodiment will be described (see FIGS. 9 to 13). The vehicle lamp 1Y is applied to, for example, the vehicle lamp 1 described above.

Figure 9:
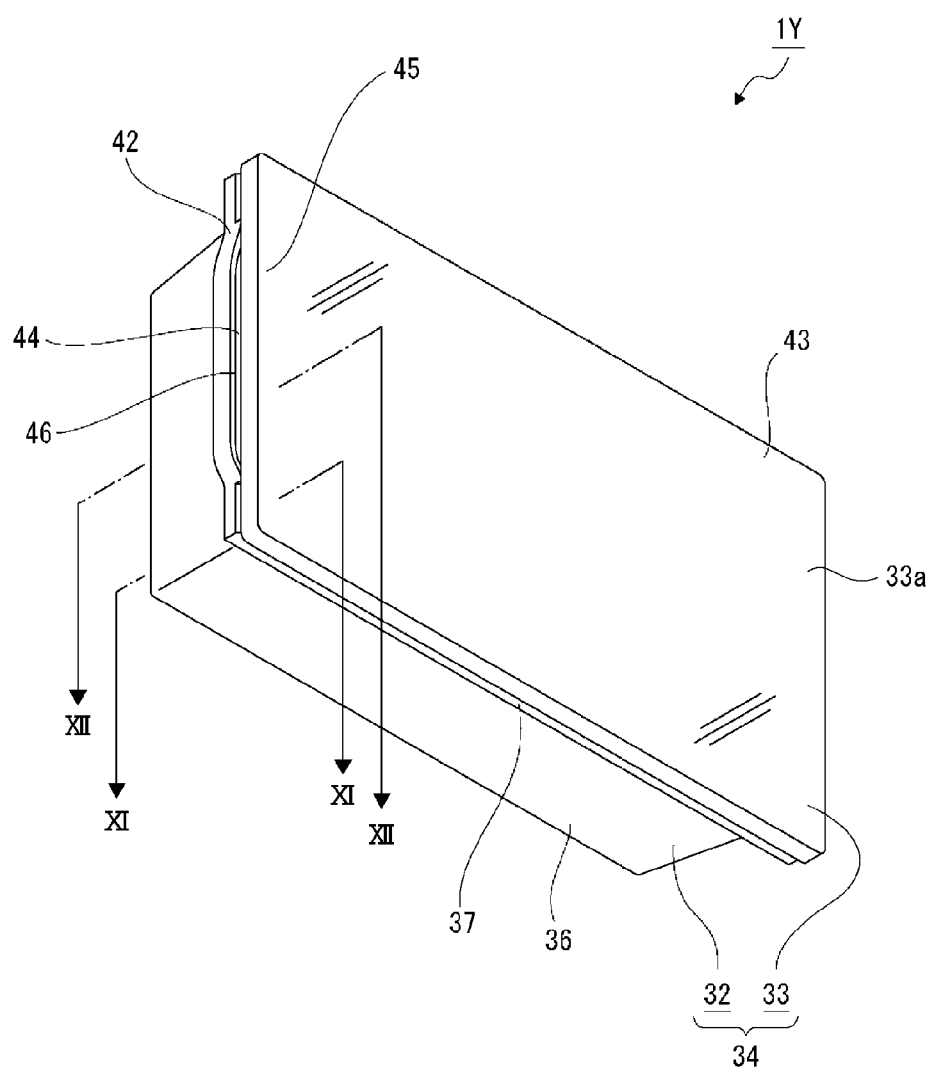
FIG. 9 illustrates a vehicle lamp related to a second embodiment together with FIGS. 10 to 13, and is a perspective view of the vehicle lamp.
Figure 10:
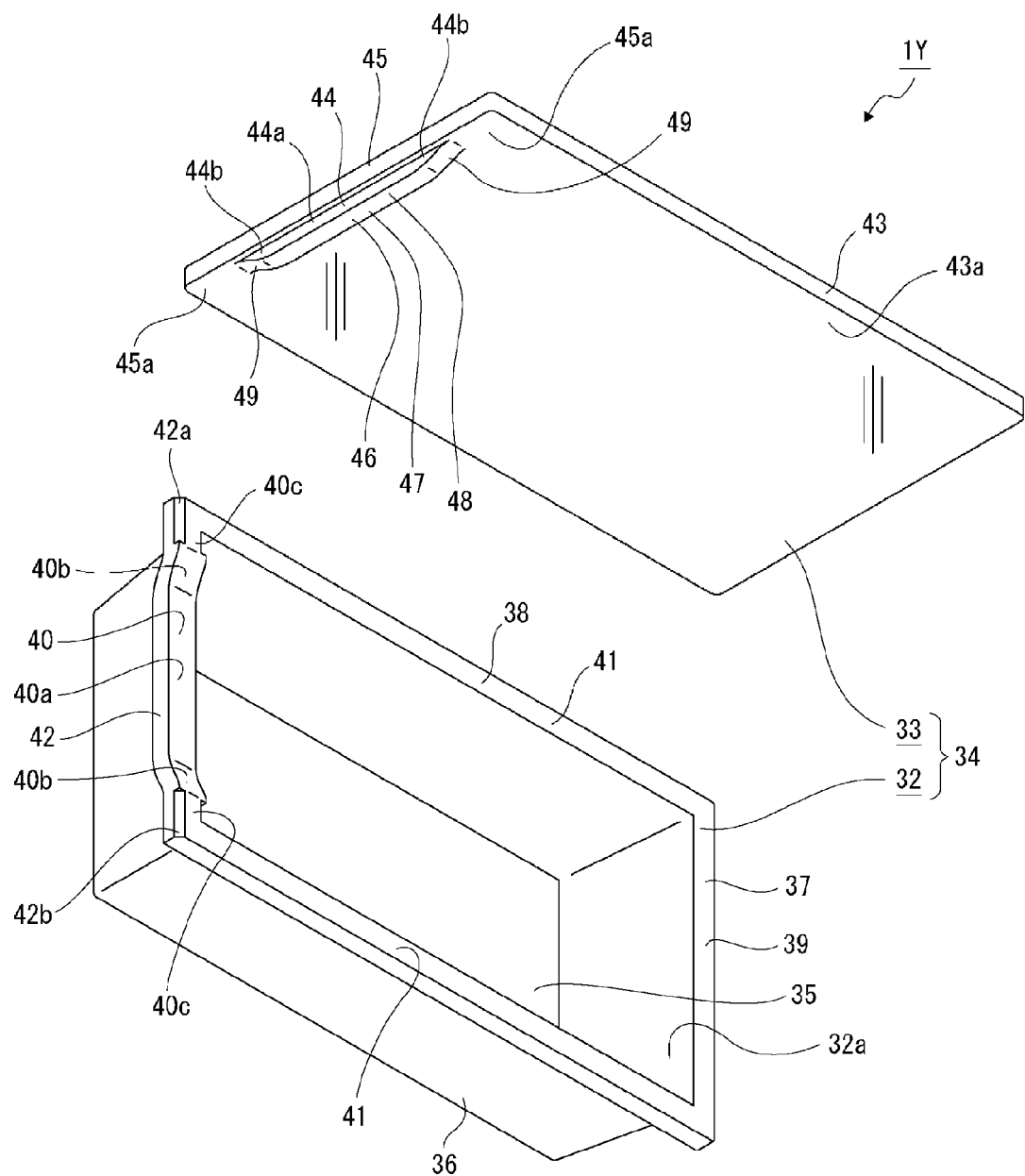
FIG. 10 is a perspective view of the vehicle lamp illustrated in a state where a lamp housing and a cover are separated from each other.
Figure 11:
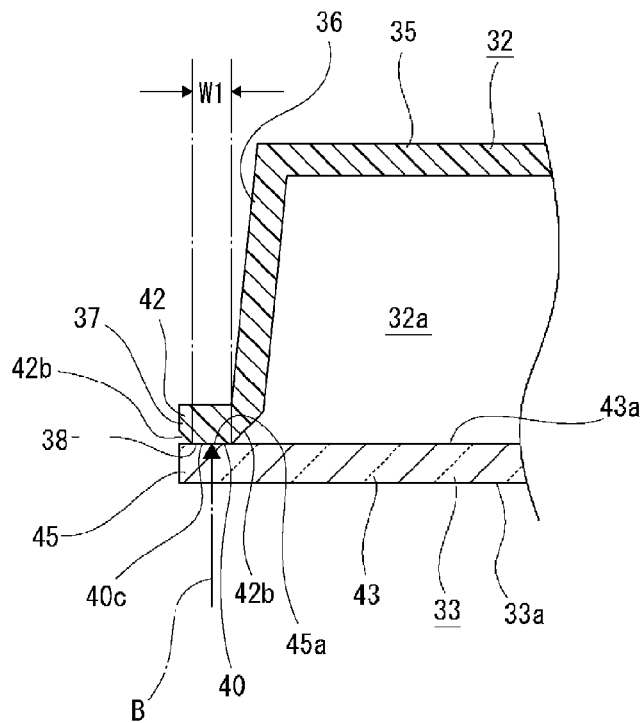
FIG. 11 is a cross-sectional view taken along the line XI-XI in FIG. 9.

The vehicle lamp 1Y includes, for example, a lamp housing 32 that is opened rearward and a cover 33 that closes an inner space 32a of the lamp housing 32 (see FIGS. 9 and 10). A lamp casing 34 is constituted by the lamp housing 32 and the cover 33.

In addition to a light source (not illustrated) that emits light, for example, a light guide (not illustrated) that guides the light emitted from the light source to a predetermined direction is disposed inside the lamp casing 34.

The lamp housing 32 is made of, for example, an opaque resin such as ABS resin (acrylonitrile copolymer resin), and includes, for example, a substantially rectangular base surface portion 35 directed in the substantially front-rear direction, a peripheral surface portion 36 that protrudes substantially rearward from the outer peripheral portion of the base surface portion 35, and a frame-shaped annular portion 37 continuous to the rear end of the peripheral surface portion 36. The outer peripheral side end portion of the annular portion 37 is projected outward from the peripheral surface portion 36 and is formed in a flange shape.

The rear surface of the annular portion 37 is formed as a welding surface 38 (see FIG. 10). The welding surface 38 is formed in, for example, a substantially rectangular shape, and is constituted by a side portion 39, a side adjacent portion 40, and extending portions 41 and 41. The side portion 39 is a portion extending substantially vertically, the side adjacent portion 40 is a portion extending substantially vertically and on the side adjacent to the vehicle lamp 1A, and the extending portions 41 and 41 are portions positioned at the upper side and the lower side and extending substantially in the left-right direction.

An end portion of the annular portion 37 extending vertically and positioned on the vehicle lamp 1A side is provided as a side end portion 42. Therefore, the rear surface of the side end portion 42 is formed as a side adjacent portion 40.

An intermediate portion of the side adjacent portion 40 in the vertical direction is formed as an intermediate portion 40a that is positioned forward from the other portions. Portions of the side adjacent portion 40 respectively continuous to the upper portion and the lower portion of the front side portion 40a are formed as inclined surface portions 40b and 40b, and the inclined surface portions 40b and 40b are inclined so as to be displaced rearward as being away from the intermediate portion 40a, respectively. Both the upper end portion and the lower end portion of the side adjacent portion 40 are formed as welding end portions 40c and 40c positioned rearward from the intermediate portion 40a.

In the side adjacent portion 40, the intermediate portion 40a and the inclined surface portions 40b and 40b have the same width, and the width of the welding end portions 40c and 40c is smaller than the width of the intermediate portion 40a and the inclined surface portions 40b and 40b. The welding end portions 40c and 40c includes inclined surfaces 42a and 42a, and 42b and 42b on both sides of both the upper end portion and the lower end portion of the side end portion 42 in the width direction, and thus, have the width smaller than the width of the intermediate portion 40a and the inclined surface portions 40b and 40b (see FIGS. 10 and 11). The inclined surfaces 42a and 42a and the inclined surfaces 42b and 42b are inclined so as to be displaced forward as being away in the width direction of the side end portion 42, respectively.

That is, the inclined surfaces 42a and 42a are formed by cutting off a part of the lamp housing 32 on both sides of the upper end portion of the side end portion 42 in the width direction, and thus, the width of the welding end portion 40c on the upper side is smaller than the width of the intermediate portion 40a and the inclined surface portions 40b and 40b, and the inclined surfaces 42b and 42b are formed by cutting off a part of the lamp housing 32 on both sides of the lower end portion of the side end portion 42 in the width direction, and thus, the width of the welding end portion 40c on the lower side is smaller than the width of the intermediate portion 40a and the inclined surface portions 40b and 40b, In the welding surface 38, the side portion 39 and the extending portions 41 and 41 have the same width, which is larger than the width of the welding end portions 40c and 40c. The width of the intermediate portion 40a and the inclined surface portions 40b and 40b of the side end portion 40 is larger than the width of the side portion 39 and the extending portions 41 and 41.

The cover 33 is made of, for example, a transparent material such as acrylic, and a design surface portion 43 that has an outer surface 33a facing the outside of the vehicle 100 and a welding leg 44 that protrudes forward from a part of an inner surface 43a of the design surface portion 43 are integrally formed.

The design surface portion 43 is formed in, for example, a substantially rectangular plate shape, and the end portion on the side adjacent to the vehicle lamp 1A is formed as an adjacent side end portion 45. Both the upper end portion and the lower end portion of the adjacent side end portion 45 in the inner surface are formed as adjacent side joining portions 45a and 45a that are joined to the welding surface 38. The size of the outer shape of the design surface portion 43 is slightly larger than the outer shape of the annular portion 37 of the lamp housing 32 except for the adjacent side end portion 45.

The welding leg 44 protrudes from a portion except for both the upper end portion and the lower end portion of the adjacent side end portion 45. The width of the welding leg 44 is smaller than the width of the intermediate portion 40a and the inclined surface portions 40b and 40b of the side adjacent portion 40, but the width W1 of the welding end portions 40c and 40c of the side adjacent portion 40 and the width W2 of the welding leg 44 are substantially the same with each other (see FIGS. 11 and 12).

The welding leg 44 is provided as a facing surface portion 46 that entirely faces the adjacent vehicle lamp 1A (see FIG. 10). The facing surface portion 46 is formed in a shape extending vertically.

A tip surface of the welding leg 44 is formed as a joining surface 47 that is joined to the welding surface 38 by laser welding.

In the joining surface 47, a portion except for both the upper end portion and the lower end portion is formed as a first joining portion 48 that is positioned forward from both the upper end portion and the lower end portion, and both the upper end portion and the lower end portion are formed as second joining portions 49 and 49 inclined so as to be displaced rearward as being away from the first joining portion 48.

Therefore, the welding leg 44 is constituted by a first portion 44a and second portions 44b and 44b. The first portion 44a has the first joining portion 48 and the protrusion amount from the design surface portion 43 is maximized. The second portions 44b and 44b have the second joining portions 49 and 49, respectively, and are continuous to the upper portion and the lower portion of the first portion 44a, respectively, and the protrusion amount from the design surface portion 43 in the vertical direction is changed.

In the vehicle lamp 1Y configured as described above, the cover 33 is joined to the lamp housing 32 by laser welding. The joining of the cover 33 to the lamp housing 32 by laser welding is performed by irradiating laser light B from the outer surface side of the outer peripheral portion of the design surface portion 43 (see FIGS. 11 and 12).

The laser light B transmits the design surface portion 43 or the design surface portion 43 and the welding leg 44, and reaches the welding surface 38 of the lamp housing 32. When the laser light B reaches the welding surface 38, the joining surface 47 and the welding surface 38 or the inner surface 43a of the design surface portion 43 and the welding surface 38 are melted, and the cover 33 is joined to the lamp housing 32.

At this time, in the facing surface portion 46, the first joining portion 48 is welded to the intermediate portion 40*a* of the side adjacent portion 40, the second joining portions 49 and 49 are welded to the inclined surface portions 40*b* and 40*b* of the side adjacent portion 40, respectively, and the adjacent side joining portions 45*a* and 45*a* of the adjacent side end portion 45 are welded to the welding end portions 40*c* and 40*c* of the side adjacent portion 40, respectively. Further, the inner surface 43*a* of the design surface portion 43 is welded to the extending portions 41 and 41 and the side portion 39.

Figure 13:
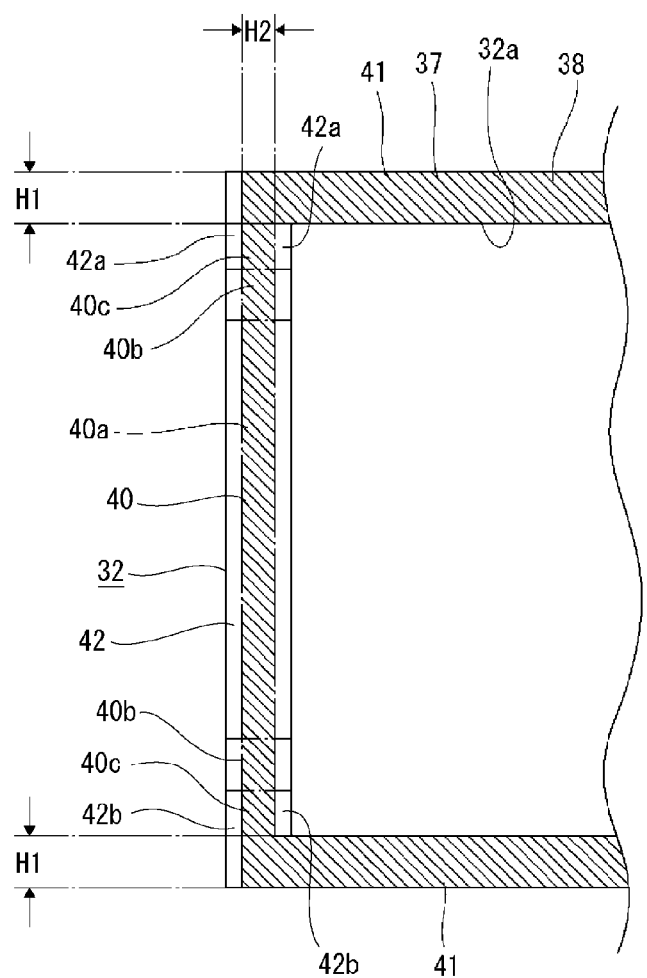
FIG. 13 is a rear view illustrating a welding portion in a lamp housing.

As described above, the adjacent side joining portions 45*a* and 45*a* of the adjacent side end portion 45 are welded to the welding end portion 40*c* and 40*c* of the side adjacent portion 40, respectively, but the width W1 of the welding end portion 40*c* and 40*c* and the width W2 of the welding leg 44 are substantially equal to each other, and thus, the inner surface 43*a* of the design surface portion 43 and the joining surface 47 of the welding leg 44 are welded with the same welding width in the side adjacent portion 40 (the welding portion is illustrated by hatching in FIG. 13). At this time, in the side adjacent portion 40, the welding portions of the design surface portion 43 with respect to the welding end portions 40*c* and 40*c* and the welding portions of the welding leg 44 with respect to the intermediate portion 40*a* and the inclined surface portions 40*b* and 40*b* are positioned to be continuous in the vertical direction without being deviated in the left-right direction.

As a welding method of the cover 33 with respect to the lamp housing 32, a scan method in which an irradiation head is moved along the outer peripheral portion of the design surface portion 43 to perform the irradiation of laser light, or a galvano method in which an irradiation head is fixed and a galvano mirror is operated inside the irradiation head to perform the irradiation of laser light is used. The welding of the cover 33 with respect to the lamp housing 32 may be performed by the scan method, for example, for a portion where the welding leg 44 is joined to the welding surface 38 since it is necessary to secure a good transmission state of the laser light B with respect to the welding leg 44 by irradiating the welding surface 38 with the laser light B perpendicularly, and may be performed by the galvano method capable of irradiating the laser light B in a wide range substantially at the same time for a portion where the design surface portion 43 is joined to the welding surface 38. The scan method may be used in the irradiation of the laser light to the adjacent end portion 45, and the galvano method may be used in the irradiation of the laser light to the other portions.

In the state where the cover 33 is joined to the lamp housing 32, the outer peripheral surface of the design surface portion 43 is positioned outside the outer peripheral surface of the annular portion 37 except for the adjacent side end portion 45, and the position of the side surface of the adjacent side end portion 45 in the left-right direction is substantially aligned with the position of the side edge of the side adjacent portion 40 outer side.

Figure 12:
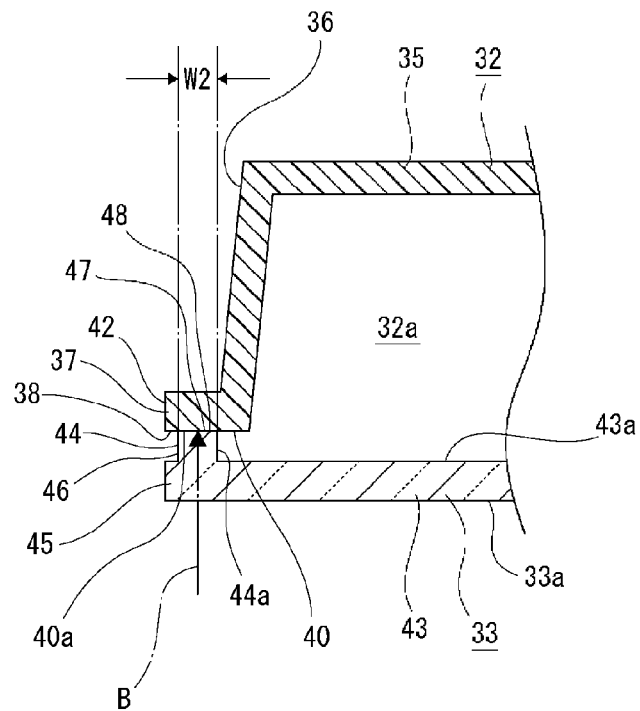
FIG. 12 is a cross-sectional view taken along the line XII-XII in FIG. 9.

Further, as described above, since the joining surface 47 is formed to have a constant width that is smaller than the width of the welding surface 38, the joining surface 47 is welded, for example, to the central portion of the welding surface 38 in the width direction (see FIG. 12).

As described above, since the joining surface 47 is smaller than the width of the welding surface 38, regardless of the positional accuracy of the cover 33 with respect to the lamp housing 32, the entire joining surface 47 is welded and joined to the welding surface 38, and thus, it is possible to secure an improved joined state of the cover 33 with respect to the lamp housing 32. Further, by making the joining surface 47 smaller than the width of the welding surface 38 to reduce the width of the welding leg 44, it is possible to suppress the sink of the welding leg 44 during cooling of the cover 33 by injection molding, and high processing accuracy of the cover 33 may be secured.

Further, in a portion where the welding leg 44 is not provided, the design surface portion 43 of the cover 33 is welded and joined to the welding surface 38. However, as described above, since the outer peripheral surface of the design surface portion 43 is positioned outside the outer peripheral surface of the annular portion 37 except for the adjacent side end portion 45, a portion of the design surface portion 43 slightly inside from the outer periphery is welded and joined to the welding surface 38.

As described above, since the outer shape of the design surface portion 43 is larger than the outer shape of the annular portion 37 and the outer peripheral surface of the design surface portion 43 except for the adjacent side end portion 45 is positioned outside the outer peripheral surface of the annular portion 37, regardless of the positional accuracy of the cover 33 with respect to the lamp housing 32, the design surface portion 43 is welded and joined to the entire welding surface 38, and thus, it is possible to secure an improved joined state of the cover 33 with respect to the lamp housing 32.

In order to secure high joinability of the cover 33 with respect to the lamp housing 32, the welding area of the cover 33 with respect to the lamp housing 32 may be wide. In the vehicle lamp 1Y, a width H1 of a portion to which the design surface portion 43 except for the adjacent side end portion 45 is joined is larger than a width H2 of a portion to which the welding leg 44 is joined (see FIG. 13).

As described above, by making the width H1 of the portion to which the design surface portion 43 where the sink is unlikely caused during cooling by injection molding is joined large, and by making the width H2 of the portion to which the welding leg 44 where the sink is likely caused during cooling by injection molding is joined small, high joinability of the cover 33 with respect to the lamp housing 32 is promoted by securing a sufficient welding area, and then high forming accuracy of the cover 33 may be secured.

As described above, in the vehicle lamp 1Y, the welding leg 44 protrudes from the portion of the adjacent side end portion 45 except for both the upper end portion and the lower end portion, both the upper end portion and the lower end portion of the adjacent side end portion 45 are formed as the adjacent side joining portions 45*a* and 45*a* that are welded to the welding surface 38, respectively, the portions of the welding surface 38 to which the adjacent side joining portions 45*a* and 45*a* are joined are formed as the welding end portions 40*c* and 40*c*, and the width of the welding end portions 40*c* and 40*c* is substantially equal to the width of the welding leg 44.

Therefore, in the end portion of the cover 33 on the vehicle lamp 1A side, the adjacent side joining portions 45*a* and 45*a* are welded to the welding surface 38 in a state of being joined to the welding end portions 40*c* and 40*c* having substantially the same width as the welding leg 44, and there is no unwelded portion in the end portion of the cover 33 on the vehicle lamp 1A side, and thus, problems such as burrs or foaming marks are projected to the unwelded portion do not occur, and an improved joined state of the cover 33 with respect to the lamp housing 32 may be secured.

Further, in the lamp housing 32, the inclined surfaces 42*a* and 42*a*, and 42*b* and 42*b* away from the cover 33, respectively, as being away from the welding portions 40c and 40c in the width direction are formed on both sides of the welding end portions 40c and 40c in the width direction.

Therefore, since the width of the welding end portions 40c and 40c is determined by the formation of the inclined surfaces 42a and 42a, and 42b and 42b on both sides, the welding end portions 40c and 40c may be easily formed, and the improvement in the dimensional accuracy of the width of the welding end portions 40c and 40c with respect to the width of the welding leg 44 may be promoted.

(Others)

The examples in which the vehicle lamps 1X and 1Y are applied to the vehicle lamp 1 are described in the above, but the vehicle lamps 1X and 1Y may be applied to the vehicle lamp 1A, respectively. Further, the vehicle lamps 1X and 1Y may be applied to both the vehicle lamp 1 and the vehicle lamp 1A, respectively.

DESCRIPTION OF SYMBOLS

100: vehicle
1: vehicle lamp
1A: vehicle lamp
1X: vehicle lamp
2: lamp housing
2a: inner space
3: cover
8: welding surface
12: design surface portion
13: welding leg
14: adjacent side end portion
17: facing surface portion
18: upper side portion
19: lower side portion
1Y: vehicle lamp
32: lamp housing
32a: inner space
33: cover
38: welding surface
40c: welding end portion
42a: inclined surface
42b: inclined surface
43: design surface portion
44: welding leg
45: adjacent side end portion
45a: adjacent side joining portion
46: facing surface portion

What is claimed is:

1. A vehicle lamp comprising:
a lamp housing having an inner space and an annular frame where a welding surface is formed, and
a cover configured to cover the inner space and be joined to the lamp housing by laser welding to be disposed adjacent to another vehicle lamp,
wherein the cover includes a design surface portion that has an outer surface facing an outside of a vehicle and is partially welded to the welding surface, an inner surface facing the inner space, and a welding leg that protrudes from the inner surface adjacent a portion of an outer peripheral portion in the design surface portion and is welded to the welding surface,
an end portion of the outer peripheral portion in the design surface portion on a side of the another vehicle lamp is provided as an adjacent side end portion, the adjacent side end portion being positioned between an upper end portion of the cover and a lower end portion of the cover opposite the upper end portion,
the welding leg includes a facing surface that protrudes from the adjacent side end portion and faces the another vehicle lamp, an upper side portion that is continuous with the upper end portion of the cover, and a lower side portion that is continuous with the lower end portion of the cover,
the facing surface of the welding leg is provided at a position extending from the upper end portion to the lower end portion of the cover along the adjacent side end portion,
the upper side portion and the lower side portion extend along an upper edge and a lower edge of the cover, respectively, in a direction opposite to the facing surface,
wherein the upper end portion of the cover comprises an inclined portion and a planar portion and the lower end portion of the cover comprises an inclined portion and a planar portion, respectively,
wherein the planar portion of the upper end portion is extended along an upper corner of the cover so as to form an L-shape, and the planar portion of the lower end portion is extended along a lower corner of the cover so as to form another L-shape,
wherein a joining surface of the welding leg facing the welding surface includes a first joining portion, a pair of second joining portions continuous to upper and lower portions of the first joining portion and being inclined relative to the first joining portion, and a pair of third joining portions continuous to the pair of second joining portions and forming upper and lower end portions of the joining surface continuous with the facing surface, and
wherein the upper side portion and lower side portion include a pair of fourth joining portions continuous to the third joining portions and extending in a direction perpendicular to the third joining portions, the fourth joining portions being positioned in the same plane as the third joining portions.

2. The vehicle lamp according to claim 1, wherein the upper side portion includes an upper side surface that is continuous with the facing surface and is perpendicular to the facing surface, and the lower side portion includes a lower side surface that is continuous with the facing surface and is perpendicular to the facing surface.

3. The vehicle lamp according to claim 1, wherein a width of the welding leg is smaller than a width of a portion of the welding surface to which the welding leg is welded, and
a width of a portion of the welding surface to which the design surface portion is welded is larger than the width of the welding leg.

4. The vehicle lamp according to claim 1, wherein a plane of the first joining portion relative to the inner surface is higher than a plane of the third joining portions relative to the inner surface.

5. The vehicle lamp according to claim 1, wherein the upper side portion and the lower side portion further include a pair of fifth joining portions continuous to the fourth joining portions, the fifth joining portions being inclined relative to the fourth joining portions towards the inner surface of the cover.

6. The vehicle lamp according to claim 1, wherein the upper edge is formed between the upper end portion and the inner surface of the cover and the lower edge is formed between the lower end portion and the inner surface of the cover.

7. The vehicle lamp according to claim 1, wherein the upper end portion further comprises another inclined portion connected to an end of the L-shaped planar portion, and the lower end portion further comprises another inclined portion connected to an end of the another L-shaped planar portion.

\* \* \* \* \*